United States Patent
Cho et al.

(10) Patent No.: US 8,854,204 B2
(45) Date of Patent: Oct. 7, 2014

(54) HOME APPLIANCE

(75) Inventors: In Haeng Cho, Changwon-si (KR); Mun Ho Choi, Changwon-si (KR); Tae In Park, Changwon-si (KR); Phal Jin Lee, Changwon-si (KR); Jin Hwan Son, Changwon-si (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 12/757,339

(22) Filed: Apr. 9, 2010

(65) Prior Publication Data
US 2010/0259377 A1    Oct. 14, 2010

Related U.S. Application Data (60) Provisional application No. 61/168,397, filed on Apr. 10, 2009.

(30) Foreign Application Priority Data

Apr. 10, 2009  (KR) .................. 10-2009-0031496

(51) Int. Cl.
*G08B 25/10*  (2006.01)
*H04L 12/28*  (2006.01)

(52) U.S. Cl.
CPC ....... *H04L 12/2825* (2013.01); *H04L 2012/285* (2013.01); *H04L 12/2827* (2013.01)
USPC .................................. 340/531; 340/539.1

(58) Field of Classification Search
USPC .................. 340/531, 532, 539.1
See application file for complete search history.

(56) References Cited

U.S. PATENT DOCUMENTS

| | | | |
|---|---|---|---|
| 3,910,322 A | | 10/1975 | Hardesty et al. |
| 4,146,754 A | * | 3/1979 | Rose .................. 379/102.03 |
| 4,766,505 A | | 8/1988 | Nakano et al. |
| 4,797,656 A | * | 1/1989 | Keppler .................. 340/539.26 |
| 4,897,659 A | | 1/1990 | Mellon |
| 4,897,857 A | | 1/1990 | Wakatsuki et al. |
| 4,916,439 A | * | 4/1990 | Estes et al. .................. 340/679 |

(Continued)

FOREIGN PATENT DOCUMENTS

| CN | 1212304 | 3/1999 |
|---|---|---|
| CN | 1343862 | 4/2002 |

(Continued)

OTHER PUBLICATIONS

Russian Office Action dated Feb. 7, 2012. (with translation).

(Continued)

*Primary Examiner* — Jennifer Mehmood
*Assistant Examiner* — Rufus Point
(74) *Attorney, Agent, or Firm* — Ked & Associates, LLP (57) ABSTRACT

A home appliance is provided. The home appliance includes a main controller for generating a first data signal including status information and a second data signal including operating information, a first sound output device for outputting a first sound signal according to the first data signal including status information to be transmitted through a communication network, and a second sound output device for outputting a second sound signal according to the second data signal including operating information to be perceived by a user. Thus, the sound signal regarding the status information and the sound signal regarding the operating information can be output through the different sound output devices, i.e., the first and second sound output devices.

6 Claims, 9 Drawing Sheets

(56) References Cited

U.S. PATENT DOCUMENTS

| | | | |
|---|---|---|---|
| 4,977,394 | A | 12/1990 | Manson et al. |
| 5,103,214 | A * | 4/1992 | Curran et al. ............... 340/691.1 |
| 5,210,784 | A | 5/1993 | Wang et al. |
| 5,268,666 | A | 12/1993 | Michel et al. |
| 5,452,344 | A | 9/1995 | Larson |
| 5,506,892 | A | 4/1996 | Kojima et al. |
| 5,586,174 | A * | 12/1996 | Bogner et al. ............ 379/106.01 |
| 5,664,218 | A * | 9/1997 | Kim et al. ...................... 345/519 |
| 5,757,643 | A | 5/1998 | Kuroda et al. |
| 5,774,529 | A | 6/1998 | Johannsen et al. |
| 5,864,828 | A | 1/1999 | Atkins |
| 5,939,992 | A * | 8/1999 | Devries et al. ................. 340/657 |
| 5,940,915 | A | 8/1999 | Nam ................................. 8/159 |
| 5,987,105 | A * | 11/1999 | Jenkins et al. ............ 379/106.01 |
| 6,121,593 | A | 9/2000 | Mansbery et al. |
| 6,157,313 | A * | 12/2000 | Emmermann ................ 340/5.42 |
| 6,424,252 | B1 * | 7/2002 | Adler ........................ 340/311.2 |
| 6,727,814 | B2 * | 4/2004 | Saltzstein et al. ............. 340/531 |
| 6,759,954 | B1 | 7/2004 | Myron et al. |
| 6,763,458 | B1 | 7/2004 | Watanabe et al. ............. 713/100 |
| 6,778,868 | B2 | 8/2004 | Imamura et al. |
| 6,784,801 | B2 * | 8/2004 | Watanabe et al. ............. 340/679 |
| 6,870,480 | B2 * | 3/2005 | Suzuki et al. ................. 340/679 |
| 6,873,255 | B2 * | 3/2005 | Gallagher ..................... 340/531 |
| 6,906,617 | B1 | 6/2005 | Van der Meulen |
| 7,010,612 | B1 | 3/2006 | Si et al. |
| 7,135,982 | B2 | 11/2006 | Lee ................................ 340/635 |
| 7,243,174 | B2 * | 7/2007 | Sheahan et al. ................. 710/72 |
| 7,266,164 | B2 | 9/2007 | Jeon et al. |
| 7,280,643 | B2 | 10/2007 | Howard et al. ............ 379/93.37 |
| 7,337,457 | B2 | 2/2008 | Pack et al. ....................... 725/40 |
| 7,363,031 | B1 * | 4/2008 | Aisa ............................. 455/419 |
| 7,383,644 | B2 * | 6/2008 | Lyu et al. ......................... 34/596 |
| 7,439,439 | B2 | 10/2008 | Hayes et al. .................... 84/600 |
| 7,509,824 | B2 | 3/2009 | Park et al. .................... 68/12.23 |
| 7,574,269 | B2 * | 8/2009 | Cenedese et al. ............... 700/17 |
| 7,631,063 | B1 * | 12/2009 | Ho et al. ....................... 709/223 |
| 7,648,476 | B2 * | 1/2010 | Bock et al. ................... 604/4.01 |
| 7,653,512 | B2 | 1/2010 | Cheung et al. ................ 702/184 |
| 7,750,227 | B2 * | 7/2010 | Hayes et al. .................... 84/600 |
| 7,843,819 | B1 | 11/2010 | Benveniste |
| 7,965,632 | B2 | 6/2011 | Sugaya |
| 8,027,752 | B2 | 9/2011 | Castaldo et al. |
| 8,040,234 | B2 | 10/2011 | Ebrom et al. ................. 340/531 |
| 8,045,636 | B1 | 10/2011 | Lee et al. |
| 8,132,049 | B2 | 3/2012 | Yasukawa et al. |
| 8,204,189 | B2 * | 6/2012 | Rhodes et al. ............ 379/106.03 |
| 8,325,054 | B2 * | 12/2012 | Kim et al. ..................... 340/679 |
| 8,391,255 | B2 | 3/2013 | Ribiere et al. |
| 8,428,910 | B2 * | 4/2013 | Papadimitriou et al. ...... 702/185 |
| 2002/0029575 | A1 * | 3/2002 | Okamoto ........................ 62/125 |
| 2002/0032491 | A1 | 3/2002 | Imamura et al. |
| 2002/0078742 | A1 | 6/2002 | Kim ................................ 73/162 |
| 2002/0097161 | A1 * | 7/2002 | Deeds ........................... 340/601 |
| 2002/0116959 | A1 | 8/2002 | Ohta et al. |
| 2002/0120728 | A1 | 8/2002 | Braatz et al. |
| 2003/0028345 | A1 | 2/2003 | Watkins et al. |
| 2003/0058101 | A1 * | 3/2003 | Watanabe et al. ............. 340/540 |
| 2003/0110363 | A1 * | 6/2003 | Bachot et al. ................. 711/167 |
| 2003/0128850 | A1 * | 7/2003 | Kimura et al. ................. 381/82 |
| 2003/0144010 | A1 | 7/2003 | Dollinger |
| 2003/0167782 | A1 * | 9/2003 | Roh et al. ........................ 62/126 |
| 2003/0196492 | A1 | 10/2003 | Remboski et al. ............... 73/593 |
| 2004/0032853 | A1 | 2/2004 | D'Amico et al. |
| 2004/0132444 | A1 | 7/2004 | Herrmann |
| 2004/0158333 | A1 | 8/2004 | Ha et al. |
| 2004/0211228 | A1 | 10/2004 | Nishio et al. |
| 2004/0249903 | A1 | 12/2004 | Ha et al. |
| 2004/0261468 | A1 | 12/2004 | Lueckenbach |
| 2005/0015890 | A1 | 1/2005 | Kim et al. |
| 2005/0028034 | A1 | 2/2005 | Gantman et al. |
| 2005/0029976 | A1 | 2/2005 | Terry et al. |
| 2005/0086979 | A1 | 4/2005 | Son et al. |
| 2005/0129200 | A1 | 6/2005 | Forrest et al. ............... 379/93.37 |
| 2005/0134472 | A1 | 6/2005 | Jang et al. |
| 2005/0162909 | A1 | 7/2005 | Wooldridge |
| 2005/0222859 | A1 | 10/2005 | Ha |
| 2006/0048405 | A1 | 3/2006 | Baek et al. |
| 2006/0066758 | A1 | 3/2006 | Higashihara |
| 2006/0089818 | A1 | 4/2006 | Norell et al. |
| 2006/0136544 | A1 | 6/2006 | Atsmon et al. |
| 2006/0168740 | A1 | 8/2006 | Ha et al. |
| 2006/0259199 | A1 | 11/2006 | Gjerde et al. |
| 2007/0113595 | A1 | 5/2007 | Harwood et al. |
| 2007/0137265 | A1 | 6/2007 | Shikamori et al. |
| 2007/0175883 | A1 | 8/2007 | Miu et al. |
| 2007/0189323 | A1 | 8/2007 | Swoboda et al. |
| 2007/0219756 | A1 | 9/2007 | Frankel et al. |
| 2007/0272286 | A1 | 11/2007 | Curtius et al. |
| 2008/0036619 | A1 | 2/2008 | Rhodes et al. |
| 2008/0072383 | A1 | 3/2008 | Bextermoller et al. |
| 2008/0122648 | A1 * | 5/2008 | Ebrom et al. ............ 340/825.22 |
| 2008/0181058 | A1 | 7/2008 | Hayakawa |
| 2009/0036778 | A1 | 2/2009 | Cohen et al. |
| 2009/0067102 | A1 | 3/2009 | Cline et al. |
| 2009/0160637 | A1 | 6/2009 | Maeng |
| 2009/0169434 | A1 | 7/2009 | Ogusu |
| 2009/0282308 | A1 | 11/2009 | Gutsche et al. |
| 2009/0323914 | A1 | 12/2009 | Lee et al. |
| 2010/0037401 | A1 | 2/2010 | Bae et al. |
| 2010/0116060 | A1 | 5/2010 | Murayama ...................... 73/593 |
| 2011/0022358 | A1 | 1/2011 | Han et al. |
| 2011/0060553 | A1 | 3/2011 | Han et al. |
| 2011/0200189 | A1 | 8/2011 | True et al. |

FOREIGN PATENT DOCUMENTS

| | | |
|---|---|---|
| CN | 1393672 | 1/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 102017520 | 4/2011 |
| EP | 0 038 687 | 10/1981 |
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| JP | 04-241563 | 8/1992 |
| JP | 4-358497 A | 12/1992 |
| JP | 07-239176 | 9/1995 |
| JP | 10-133767 | 5/1998 |
| JP | 11-127254 | 11/1999 |
| JP | 2001-345949 | 12/2001 |
| JP | 2001-353395 A | 12/2001 |
| JP | 2002-000988 A | 1/2002 |
| JP | 2002-011274 A | 1/2002 |
| JP | 2002-031471 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 A | 10/2007 |
| JP | 2008-003562 A | 1/2008 |
| KR | 10-1991-0020404 A | 12/1991 |
| KR | 10-1996-0003308 A | 1/1996 |
| KR | 10-1996-003308 A | 1/1996 |
| KR | 10-1997-0019443 A | 4/1997 |
| KR | 10-0127232 B1 | 10/1997 |
| KR | 10-0143209 | 8/1998 |
| KR | 10-1999-020285 | 3/1999 |
| KR | 20-1999-0040564 U | 12/1999 |

(56) References Cited

FOREIGN PATENT DOCUMENTS

| | | |
|---|---|---|
| KR | 20-0162050 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2003-0000189 | 1/2003 |
| KR | 10-0389690 B1 | 6/2003 |
| KR | 10-0406094 B1 | 11/2003 |
| KR | 10-2004-0050767 | 6/2004 |
| KR | 10-2004-0095017 | 11/2004 |
| KR | 10-2004-0103352 | 12/2004 |
| KR | 10-2005-0062747 A | 6/2005 |
| KR | 10-2005-0097282 A | 10/2005 |
| KR | 10-0564761 B1 | 3/2006 |
| KR | 10-2006-0056973 | 5/2006 |
| KR | 10-2006-0103014 | 9/2006 |
| KR | 10-0641974 | 11/2006 |
| KR | 10-2007-0013090 A | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in. U.S. Appl. No. 12/757,205 dated Apr. 2, 2012.
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
European Search Report dated Oct. 14, 2011 issued in Application No. 09 73 8950.
PCT International Search Report dated May 26, 2011 issued in Application No. PCT/KR2010/005108.
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
International Search Report dated Dec. 1, 2010 (PCT/KR2010/002211).
International Search Report dated Dec. 1, 2010 (PCT/KR2010/002222).
U.S. Appl. No. 12/431,893, filed Apr. 29, 2009.
U.S. Appl. No. 12/431,903, filed Apr. 29, 2009.
U.S. Appl. No. 12/431,910, filed Apr. 29, 2009.
U.S. Appl. No. 12/432,111, filed Apr. 29, 2009.
U.S. Appl. No. 12/432,132, filed Apr. 29, 2009.
U.S. Appl. No. 12/551,827, filed Sep. 1, 2009.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/757,232, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/432,184, filed Apr. 29, 2009.
U.S. Appl. No. 13/382,334, filed Jan. 5, 2012.
U.S. Appl. No. 12/842,649, filed Jul. 23, 2010.
U.S. Appl. No. 12/842,679, filed Jul. 23, 2010.
U.S. Appl. No. 12/846,013, filed Jul. 29, 2010.
U.S. Appl. No. 12/846,040, filed Jul. 29, 2010.
U.S. Appl. No. 12/847,272, filed Jul. 30, 2010.
U.S. Appl. No. 12/847,303, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
U.S. Appl. No. 12/850,240, filed Aug. 4, 2010.
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
European Search Report dated Jan. 2, 2013.

(56) References Cited

OTHER PUBLICATIONS

Ethem M Sözer; "Simulation and Rapid Prototyping Environment for Underwater Acoustic Communications: Reconfigurable Modem"; OCEANS-Europe 2005; MIT Sea Grant College Program; Cambridge, MA, 02139; IEEE; pp. 80-85 (XP10838461A).
European Search Report dated Jan. 31, 2013. (10761908.2).
European Search Report dated Jan. 31, 2013. (10797292.9).
Japanese Office Action dated Feb. 12, 2013. (with transaltion).
European Search Report dated Dec. 17, 2012.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
Korean Notice of Allowance dated Aug. 30, 2013.
U.S. Office Action issued in U.S. Appl. No. 12/842,649 dated Oct. 8, 2013.
Chinese Office Action dated Oct. 10, 2013. (416610).
Chinese Office Action dated Oct. 10, 2013. (419110).
U.S. Notice of Allowance issued in U.S. Appl. No. 12/846,013 dated Nov. 5, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Chinese Office Action dated Dec. 16, 2013. (translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
Chinese Office Action dated Jun. 27, 2013.
U.S. Office Action issued in U.S. Appl. No. 12/431,893 dated Jul. 30, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
U.S. Office Action issued in U.S. Appl. No. 12/432,184 dated May 22, 2014.
Korean Office Action dated May 26, 2014.
U.S. Office Action issued in U.S. Appl. No. 13/382,334 dated Jun. 5, 2014.

* cited by examiner

HOME APPLIANCE

CROSS-REFERENCE TO RELATED APPLICATION

This application claims priority from U.S. Patent Application No. 61/168,397 filed on Apr. 10, 2009 in the USPTO, and Korean Patent Application No. 10-2009-0031496 filed on Apr. 10, 2009 in the Korean Intellectual Property Office, the disclosure of which is incorporated herein by reference in its entirety.

BACKGROUND OF THE INVENTION

1. Field of the Invention

The present invention relates to a home appliance and a home appliance system, and more particularly to a home appliance and a home appliance system which can correctly output status information of the home appliance through a sound signal in order to transmit the status information of the home appliance to a service center through a communication network when a failure has occurred in the home appliance.

2. Description of the Related Art

Generally, when a failure has occurred in a home appliance while the home appliance is in operation, the user makes a phone call to a service center or the like and explains details of the failure and asks about the cause of the failure.

Although European Patent Application No. EP0510519 describes a technology in which failure information of a home appliance is transmitted to a service center using a telephone network through a modem connected to the home appliance, this has a problem in that the modem should always be connected to the home appliance. Especially, connecting a telephone network to a home appliance such as a washing machine has spatial limitations since such a home appliance is generally installed in an outdoor place such as a porch of a house.

U.S. Pat. No. 5,987,105 describes a technology in which failure information of a home appliance is converted into a sound signal in an audio frequency band and the sound signal is transmitted to a service center or the like through a telephone. However, a home appliance described in this patent uses a single sound output device to output not only a variety of warning sounds, which are generated while the home appliance is in operation, but also the sound signal including failure information described above to the user. Especially, when there is a need to provide a sound signal including failure information having different output characteristics from those of warning sounds, it is difficult to satisfy such need. In addition, it is difficult to change the design of the home appliance to allow the home appliance to additionally output a sound signal including failure information using the same sound output device as that used in a general washing machine to output warning sounds. This reduces the extent of sharing of parts.

SUMMARY OF THE INVENTION

Therefore, the present invention has been made in view of the above problems, and it is an object of the present invention to provide a home appliance and a home appliance system in which a sound signal regarding status information to be transmitted through a communication network and a sound signal regarding operating information to be perceived by a user are output through different sound output devices so that each of the output sound signals has acoustic characteristics optimized for the purpose of use.

In accordance with an aspect of the present invention, the above and other objects can be accomplished by the provision of a home appliance including a main controller for generating a first data signal including status information and a second data signal including operating information, a first sound output device for outputting a first sound signal according to the first data signal including status information to be transmitted through a communication network, and a second sound output device for outputting a second sound signal according to the second data signal including operating information to be perceived by a user.

In accordance with another aspect of the present invention, there is provided a home appliance including a cabinet defining an external appearance of the home appliance, a control panel to provide a user interface, a main controller for generating a data signal including status information, a control panel controller for controlling the user interface and generating a data signal including operating information, a first sound output device for outputting a sound signal according to the data signal including the status information to be transmitted through a communication network, and a second sound output device for outputting a sound signal according to the data signal including the operating information to be perceived by a user.

In accordance with another aspect of the present invention, there is provided a home appliance including a cabinet defining an external appearance of the home appliance, a control panel to provide a user interface, a control panel controller for controlling the user interface and generating a first data signal including status information and a second data signal including operating information, a first sound output device for outputting a first sound signal according to the first data signal including status information to be transmitted through a communication network, and a second sound output device for outputting a second sound signal according to the second data signal including operating information to be perceived by a user, wherein the control panel controller and the first and second sound output devices are arranged in the control panel.

In accordance with another aspect of the present invention, there is provided a home appliance including a cabinet defining an external appearance of the home appliance, a main controller for generating a data signal including status information, a first sound output device for outputting a sound signal corresponding to the data signal including the status information to be transmitted through a communication network, a control panel to provide a user interface, a control panel controller for controlling the user interface and generating a data signal including operating information, and a second sound output device for outputting a sound signal corresponding to the data signal including the operating information to be perceived by a user, wherein the main controller and the first sound output device are arranged in the cabinet, and the control panel controller and the second sound output device are arranged in the control panel.

The home appliance of the present invention has a variety of advantages. For example, since a sound signal including status information to be transmitted through a communication network and a sound signal including operating information to be perceived by a user are output through separate sound output devices, it is possible to design the respective sound output devices taking into consideration the characteristics of the sound signals.

In addition, it is possible to minimize change in existing circuitry when a sound output device for outputting a sound signal including status information is additionally provided in the home appliance.

Further, since a separate sound output device for outputting a sound signal including status information is arranged, regardless of the position of a sound output device for outputting a sound signal including operating information, it is possible to increase user convenience and also to perform sound signal transmission through a communication network while minimizing sound signal loss.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The above and other advantages and features of the present invention and methods for accomplishing the same will be more apparent from embodiments of the present invention, described below with reference to the accompanying drawings. The present invention may, however, be embodied in many different forms and should not be construed as limited to the embodiments described below. Rather, the embodiments are provided so that this disclosure will be thorough and complete, and will fully convey the scope of the present invention to those skilled in the art. The scope of the present invention is determined by the appended claims. The same reference numbers will be used throughout this specification to refer to the same or like parts.

A home appliance and a home appliance system according to embodiments of the present invention will now be described with reference to the drawings.

Figure 1:
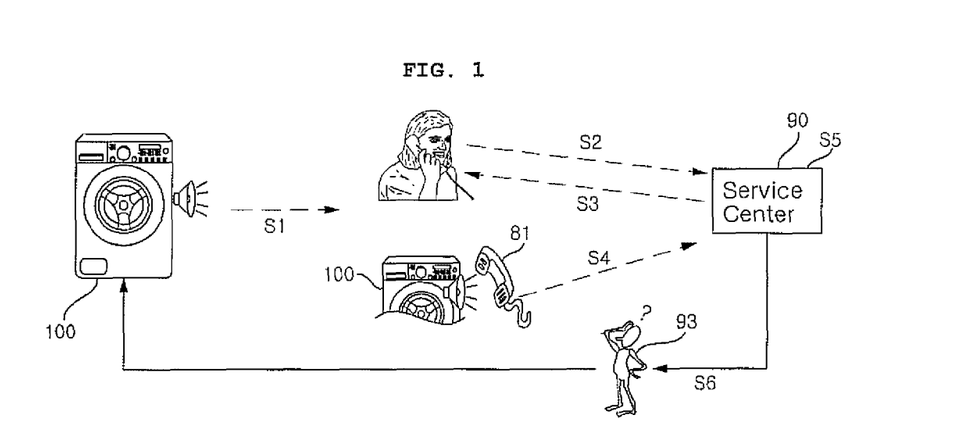
FIG. 1 illustrates a configuration of a home appliance and a home appliance system including the same according to an embodiment of the present invention.

FIG. 1 illustrates a configuration of a home appliance 100 and a home appliance system including the same according to an embodiment of the present invention.

Figure 2:
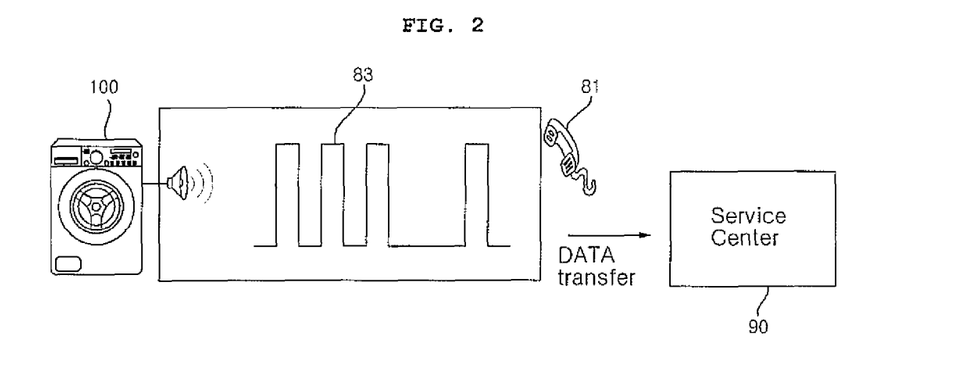
FIG. 2 illustrates a signal output configuration of a home appliance according to an embodiment of the present invention.

FIG. 2 illustrates a signal output configuration of the home appliance 100 according to an embodiment of the present invention.

As shown in FIGS. 1 and 2, when a failure has occurred in the home appliance 100 while the home appliance 100 is in operation, the home appliance 100 temporarily stops operation and outputs a variety of warning messages according to a previously programmed scheme to inform the user that a failure has occurred (S1). For example, the home appliance 100 outputs an image indicating an error code corresponding to cause of the failure or repeatedly outputs a beep sound to allow the user to perceive the occurrence of the failure in the home appliance 100. Here, the user checks the warning message displayed on the home appliance 100 and controls the operation of the home appliance 100 or makes a phone call to a service center 90 (S2). To check the operation status of the home appliance 100 and determine the cause of failure, the service center requests that the user transmit a sound signal 83 including status information of the home appliance 100 to the service center 90 (S3). Here, the status information may include data of a variety of parameters indicating the operation states of the home appliance 100 (for example, a code number indicating product type, a motor rpm value, input and output voltages, a measured value of a hall sensor, a measured value of a water level detecting sensor, etc.), information regarding a current operating cycle, and information regarding failure error. The sound signal 83 is an acoustic signal that is continuously output while controlling waveform, amplitude, and frequency characteristics of the sound.

When the user has operated an input unit provided on the home appliance 100 at the request of the service center 90, the home appliance 100 outputs a sound signal 83 including status information through a sound output device and transmits the sound signal 83 to the service center 90 through a communication network which communicates with a portable terminal 81 (S4). In the following description, the communication network is exemplified by a telephone network or a mobile communication network and the portable terminal 81 is exemplified by a phone or a portable terminal.

The service center 90 checks the received sound signal 83 and extracts the status information included in the sound signal 83 to analyze the operating state of the home appliance 100 and to determine the cause of the failure (S5) and dispatches a service technician 93 to the residence of the user to provide a service suitable for the cause of failure (S6).

In the home appliance system constructed as described above, even when the user has not informed the service center 90 of details of the cause of a failure or malfunction that has occurred in the home appliance 100 while the home appliance 100 is in operation, the service center 90 can analyze information included in the sound signal 83 to obtain status information of the home appliance 100. Therefore, users such as children or the elderly who are unaware of product information, can easily receive repair services and the service center 90 can prepare correct parts required to repair the home appliance 100, thereby increasing service efficiency.

Although the home appliance 100 of the present invention is exemplified by a washing machine in the following description, the present invention is not limited to the washing machine and may also be applied to a TV, an air conditioner, a refrigerator, an electric cooker, a microwave oven, and the like.

Figure 3:
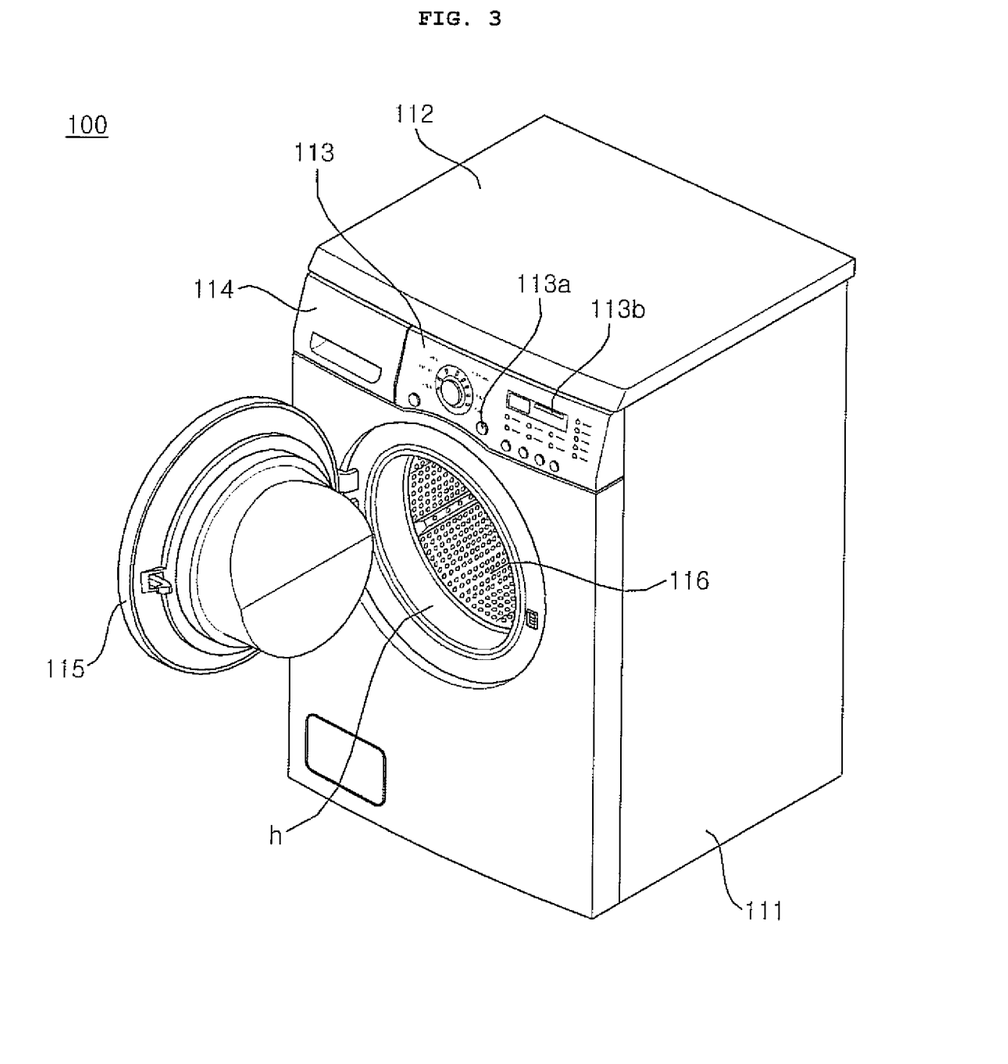
FIG. 3 is a perspective view of a washing machine according to an embodiment of the present invention.
Figure 4:
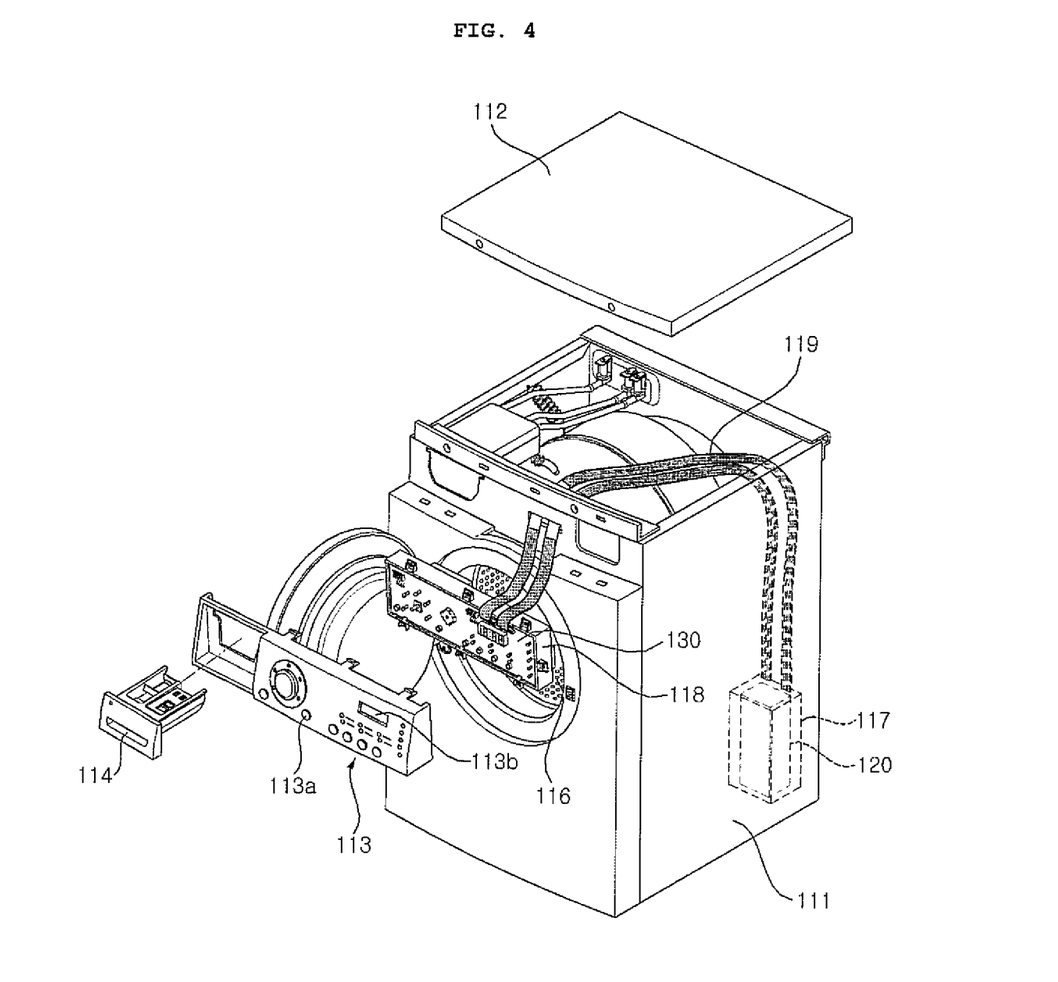
FIG. 4 is a partial perspective exploded view of the washing machine shown in FIG. 3.
Figure 5:
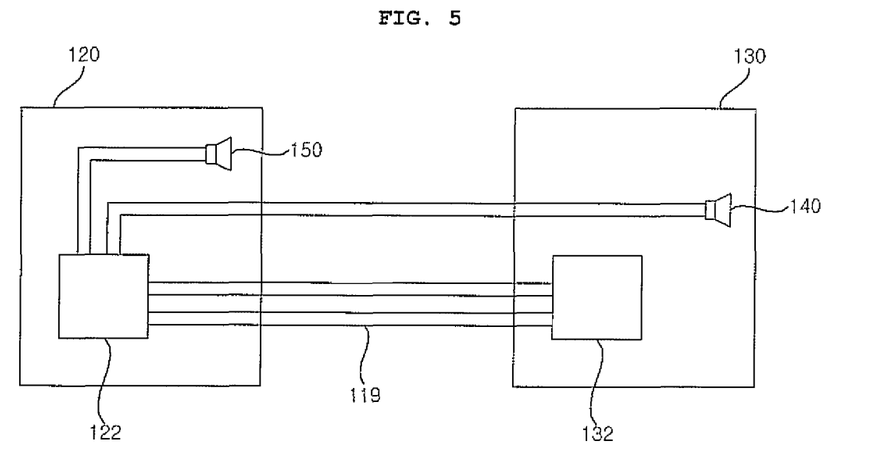
FIG. 5 illustrates control and arrangement configurations of sound output devices in the washing machine according to the embodiment of the present invention.
Figure 6:
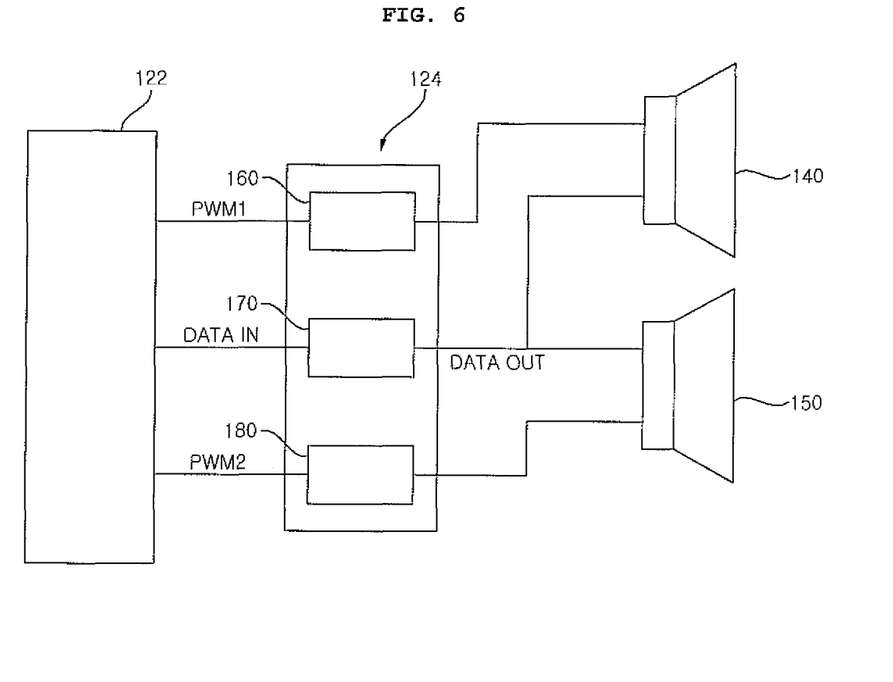
FIG. 6 is a circuit diagram illustrating how the operation of the sound output devices is controlled in the washing machine according to the embodiment of the present invention.
Figure 7:
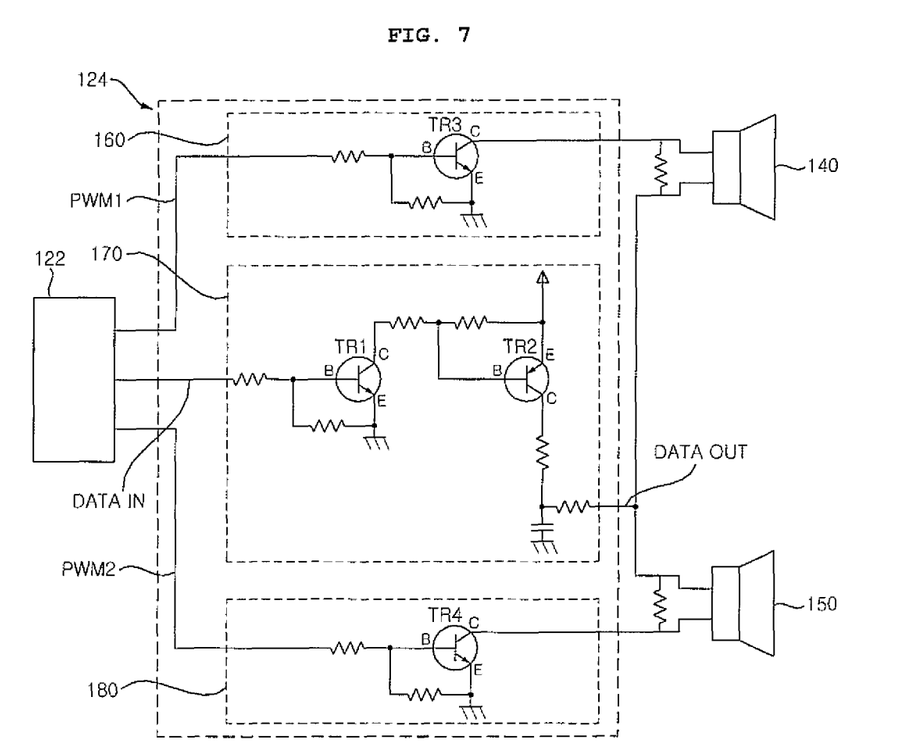
FIG. 7 is a circuit diagram illustrating an embodiment of the circuit shown in FIG. 6.

FIG. 3 is a perspective view of the washing machine 100 according to an embodiment of the present invention. FIG. 4 is a partial perspective exploded view of the washing machine 100 shown in FIG. 3. FIG. 5 illustrates control and arrangement configurations of sound output devices 140 and 150 in the washing machine 100 according to the embodiment of the present invention. FIG. 6 is a circuit diagram illustrating how the operation of the sound output devices 140 and 150 is controlled in the washing machine 100 according to the embodiment of the present invention. FIG. 7 is a circuit diagram illustrating an embodiment of the circuit shown in FIG. 6.

As shown in FIGS. 3 to 5, the washing machine 100 may include a cabinet 111 defining the external appearance of the washing machine 100, a control panel 113 that is mounted at one side of the cabinet 111 to provide a user interface, a top cover 112 that covers a top of the cabinet 111, a detergent box 114 for receiving detergent, a drum 116 that is rotatably arranged in the cabinet 111, a door 115 that opens and closes a laundry entrance h through which laundry is placed in or removed from the drum 116.

The interface includes an operating unit 113a that is provided on the control panel 113 to receive a command from the user and a display unit 113b that displays the command received from the user, the current operating cycle, remaining time, and the like. The interface functions to mediate between the user and the controller of the washing machine 100.

A first circuit board 120 in which a main controller 122 is embedded is mounted inside the cabinet 111 through a bracket 117 and a second circuit board 130 in which a control panel controller 132 (see FIG. 5) for controlling the interface is embedded is mounted inside the control panel 113 through a bracket 118. The main controller 122 and the control panel controller 132 may be electrically connected to each other through a cable 119 to enable communication therebetween. The main controller 122 and/or the control panel controller 132 may be implemented using a chip including a microprocessor. The first circuit board 120 and/or the second circuit board 130 may be implemented using a printed circuit board (PCB).

As shown in FIG. 6, the washing machine 100 also includes a main controller 122, a first sound output device 140, a second sound output device 150, and a sound output device drive unit 124. The main controller 122 generates a data signal and a control signal corresponding to the type of the data signal. The first sound output device 140 outputs a sound signal regarding status information, which is to be transmitted through the communication network, from among information items included in the data signal. The second sound output device 150 outputs a sound signal regarding operating information to be perceived by the user from among the information items included in the data signal. The sound output device drive unit 124 drives the first sound output device 140 or the second sound output device 150 according to the control signal.

The washing machine 100 of the present invention outputs the sound signal to be transmitted through the communication network and the sound signal regarding operating information to be perceived by the user through respective sound output devices. Here, the term "sound signal to be transmitted through the communication network" refers to a sound signal that is output to indicate status information regarding the cause of malfunction or failure of the washing machine 100 or the like at the request of the service center 90 and the term "sound signal regarding operating information to be perceived by the user" is one of a variety of sound signals generated while the washing machine 100 is in operation. For example, the sound signal regarding operating information to be perceived by the user may include a notification sound that serves to inform the user that an operating command has been normally input or a set cycle has been completed, or that the washing machine 100 is proceeding to a next cycle and a warning sound that serves to call attention of the user when the washing machine 100 has failed.

Since the sound signal including the status information and the sound signal including the operating information are output respectively through the first sound output device 140 and the second sound output device 150 that are separately provided, the washing machine 100 according to the embodiment of the present invention has an advantage in that the sound output devices 140 and 150 can be constructed taking into consideration respective characteristics of the sound signals. For example, the first sound output device 140 may be constructed so as to minimize signal taking consideration loss into characteristics of the communication network since the sound signal including the status information output through the first sound output device 140 should be transmitted through the communication network. For example, a telephone most efficiently transfers sound signals in a frequency band of 100 Hz to 4 kHz which is the frequency band of human voice sound. Accordingly, to transmit a sound signal including status information through a telephone, it is preferable that the first sound output device 140 be constructed using a speaker or buzzer suitable for outputting a sound signal of 100 Hz to 4 KHz.

On the other hand, since the sound signal including the operating information output through the second sound output device 150 is intended to be perceived by the user, it is preferable that the second sound output device 150 be constructed using a speaker or buzzer suitable for outputting a sound signal of 20 Hz to 20 KHz which is the audio frequency band.

Accordingly, it is preferable that the sound signal including the status information and the sound signal including the operating information be output through respective sound output devices, which are optimized for the respective purposes and characteristics of the sound signals, rather than be output through a single sound output device.

In addition, to allow a general washing machine, which includes a conventional sound output device designed to output a sound signal including operating information, to be able to also output a sound signal including status information through the conventional sound output device, it is necessary to change existing circuitry of the general washing machine, making design difficult, since, in some cases, the conventional sound output device cannot be used to output a sound signal including status information.

However, the washing machine 100 of the present invention can be constructed by providing an additional sound output device for outputting a sound signal including status information without modifying the conventional sound output device for outputting operating information. That is, the washing machine 100 of the present invention can be easily designed using the general washing machine since the washing machine 100 can be constructed simply by adding a circuit associated with the additional sound output device 140 to the existing circuitry while minimizing change in existing circuitry.

Especially, the general washing machine includes the sound output device for outputting operating information inside a "cabinet" or "case" structure. In this case, since the sound output device is intended to transfer a variety of notification sounds associated with operating information of the washing machine and/or warning sounds, the sound output device may be mounted on a circuit board arranged inside the cabinet. However, since the sound signal including status information should be finally transmitted through the communication network, it is preferable that the sound output device be arranged at a position which is not only nearest to the telephone in order to minimize signal loss but also achieves user convenience. For example, the sound output device may be arranged inside the control panel 113 on which the user interface is implemented.

Since the first sound output device 140 is separately embedded in the second circuit board 130 that is mounted in the control panel 113, regardless of the position of the second sound output device 150, the washing machine 100 according to the embodiment of the present invention has an advantage in that user convenience is improved and loss of the sound signal including status information is minimized when the sound signal is transmitted through the communication network.

In the washing machine 100 according to the embodiment of the present invention, the main controller 122 controls the first sound output device 140 and the second sound output device 150. The main controller 122 generates a data signal including the status information or the operating information, a first control signal for controlling the operation of the first sound output device 140, and a second control signal for controlling the operation of the second sound output device 150. These control signals may each be implemented using a pulse width modulated (PWM) signal.

The sound output device drive unit 124 includes a data signal processor 170, a first sound output device driver 160, and a second sound output device driver 180. The data signal processor 170 processes the data signal including the status information generated by the main controller 122 so as to be output as a sound signal having a format that can be appropriately transmitted through the communication network. The first sound output device driver 160 processes the first control signal to control the operation of the first sound output device 140. The second sound output device driver 180 processes the second control signal to control the operation of the second sound output device 150.

In the case where the status information is included in the data signal, the main controller 122 generates the first control signal to turn on the first sound output device 140 and the second control signal to turn off the second sound output device 150. Accordingly, in this case, the first sound output device 140 outputs the sound signal including the status information. The sound signal output by the first sound output device 140 is transmitted to the service center through the communication network as described above.

On the other hand, in the case where the operating information is included in the data signal, the main controller 122 generates the first control signal to turn off the first sound output device 140 and the second control signal to turn on the second sound output device 150. Accordingly, in this case, the second sound output device 150 outputs the sound signal including the operating information. The sound signal output by the second sound output device 150 allows the user to perceive the current operating status of the washing machine 100.

As shown in FIG. 7, the data signal processor 170 includes a circuit including transistors TR1 and TR2 so as to amplify a data signal DATA IN generated by the main controller 122. That is, the data signal DATA IN input to the data signal processor 170 is processed into an amplified signal DATA OUT and the amplified signal DATA OUT is input to the first sound output device 140 and the second sound output device 150.

The first control signal PWM1 and the second control signal PWM2 generated by the main controller 122 are input to the first sound output device driver 160 and the second sound output device driver 180, respectively. Each of the first and second sound output device drivers 160 and 180 includes a switching element that performs a switching operation in response to the control signal. The switching elements of the first and second sound output device drivers 160 and 180 may be implemented using transistors TR3 and TR4, each of which is configured such that an emitter E and a collector C are short-circuited when the level of the control signal input to a base B is higher than a threshold voltage between the base B and the emitter E.

Accordingly, to allow the first sound output device 140 to output the sound signal including the status information, the level of the first control signal PWM1 based on a PWM signal should be higher than the threshold voltage between the base B and the emitter E of the transistor TR3 and the level of the second control signal PWM2 should be lower than the threshold voltage between the base B and the emitter E of the transistor TR4.

On the other hand, to allow the second sound output device 150 to output the sound signal including the operating information, the level of the first control signal PWM1 based on a PWM signal should be lower than the threshold voltage between the base B and the emitter E of the transistor TR3 and the level of the second control signal PWM2 should be higher than the threshold voltage between the base B and the emitter E of the transistor TR4.

Figure 8:
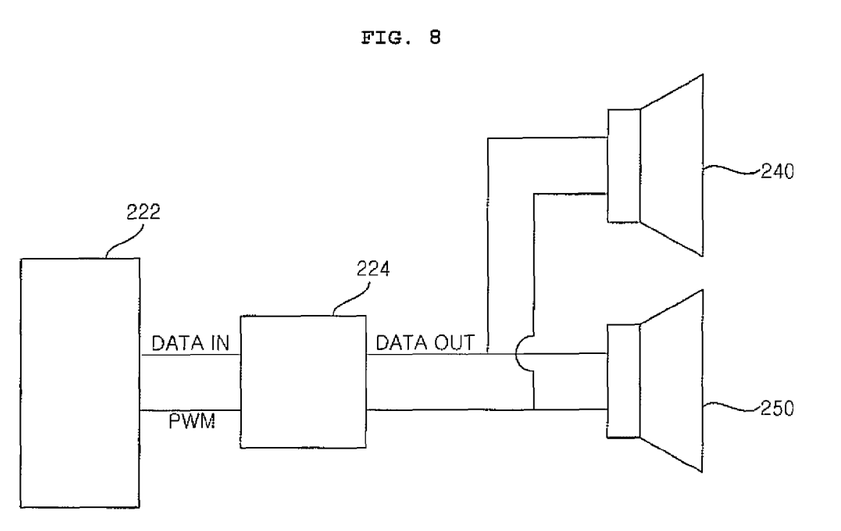
FIG. 8 illustrates a circuit diagram of a washing machine according to another embodiment of the present invention.

FIG. 8 illustrates a circuit diagram of a washing machine according to another embodiment of the present invention. As shown in FIG. 8, in the circuit of this embodiment, a main controller 222 generates a data signal DATA IN and a single control signal PWM that is commonly used to perform output control of a first sound output device 240 and a second sound output device 250 and the signals are processed at a sound output device drive unit 224, similar to the above embodiment. However, this embodiment is different from the above embodiment in that the first sound output device 240 and the second sound output device 250 operate together since the control signal PWM is common. Other portions of this embodiment are similar to those of the above embodiments and thus a description thereof is omitted herein.

Figure 9:
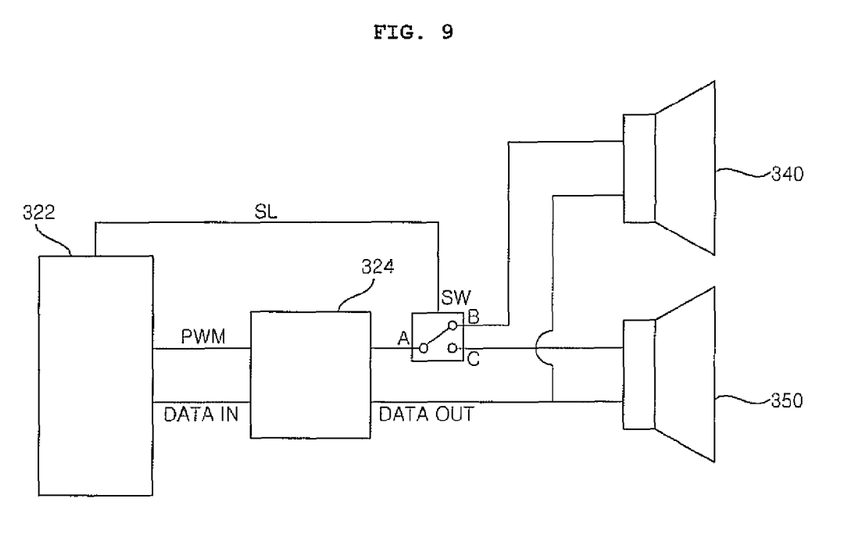
FIG. 9 illustrates a circuit diagram of a washing machine according to another embodiment of the present invention.

FIG. 9 illustrates a circuit diagram of a washing machine according to another embodiment of the present invention. As shown in FIG. 9, the circuit of this embodiment is different from that of FIG. 8 in that the circuit further includes an output selection unit SW which selects either a first sound output device 340 or a second sound output device 350 to output a sound signal according to the type of a data signal DATA IN generated by a main controller 322. That is, the main controller 322 controls the output selection unit SW through a signal line SL so that contacts A and B of the output selection unit SW are connected when the data signal DATA IN generated by the main controller 322 includes status information of the washing machine and controls the output selection unit SW through the signal line SL so that contacts A and C of the output selection unit SW are connected when the data signal DATA IN generated by the main controller 322 includes operating information of the washing machine. Other portions of this embodiment are similar to those of the above embodiments and thus a description thereof is omitted herein.

Figure 10:
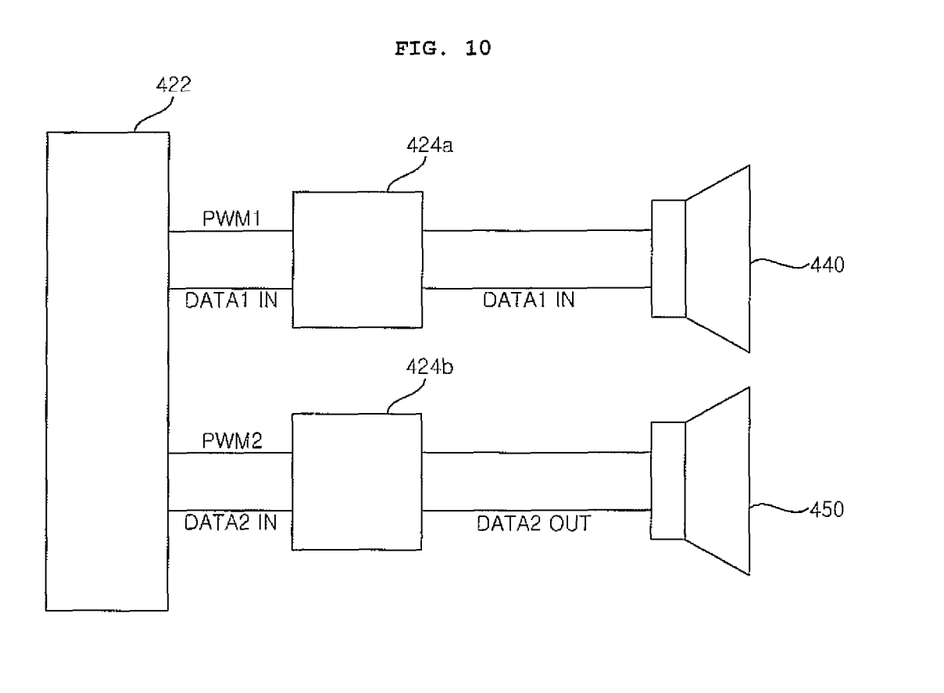
FIG. 10 is a circuit diagram of a washing machine according to another embodiment of the present invention.

FIG. 10 is a circuit diagram of a washing machine 100 according to another embodiment of the present invention. As shown in FIG. 10, the circuit of this embodiment may operate in two modes.

In the first mode, the circuit may operate in the following manner.

A main controller 422 outputs two different control signals, i.e., a first control signal PWM1 and a second control signal PWM2, and outputs data signals DATA1 IN and DATA2 IN, which include the same information, through two output ports. The data signal DATA1 In and the first control signal PWM1 are input to a sound output device drive unit 424a and the data signal DATA2 In and the second control signal PWM2 are input to a sound output device drive unit 424b.

When the data signals DATA1 IN and DATA2 IN include status information of the washing machine, the sound output device drive unit 424a activates the first sound output device 440 and the sound output device drive unit 424b deactivates the second sound output device 450.

On the other hand, when the data signals DATA1 IN and DATA2 IN include operating information of the washing machine, the sound output device drive unit 424a deactivates the first sound output device 440 and the sound output device drive unit 424b activates the second sound output device 450.

Accordingly, the first sound output device 440 outputs a sound signal when the data signals DATA1 IN and DATA2 IN include status information of the washing machine and the second sound output device 450 outputs a sound signal when the data signals DATA1 IN and DATA2 IN include operating information of the washing machine.

In the second mode, the circuit may operate in the following manner.

The main controller 422 outputs a data signal DATA1 IN including status information of the washing machine and a data signal DATA2 IN including operating information of the washing machine through different ports.

When the main controller 422 has generated the data signal DATA1 IN, the sound output device drive unit 424a activates the first sound output device 440 according to the first control signal PWM1.

On the other hand, when the main controller 422 has generated the data signal DATA2 IN, the sound output device drive unit 424b activates the second sound output device 450 according to the second control signal PWM2.

Other portions of this embodiment are similar to those of the above embodiments and thus a description thereof is omitted herein.

Figure 11:
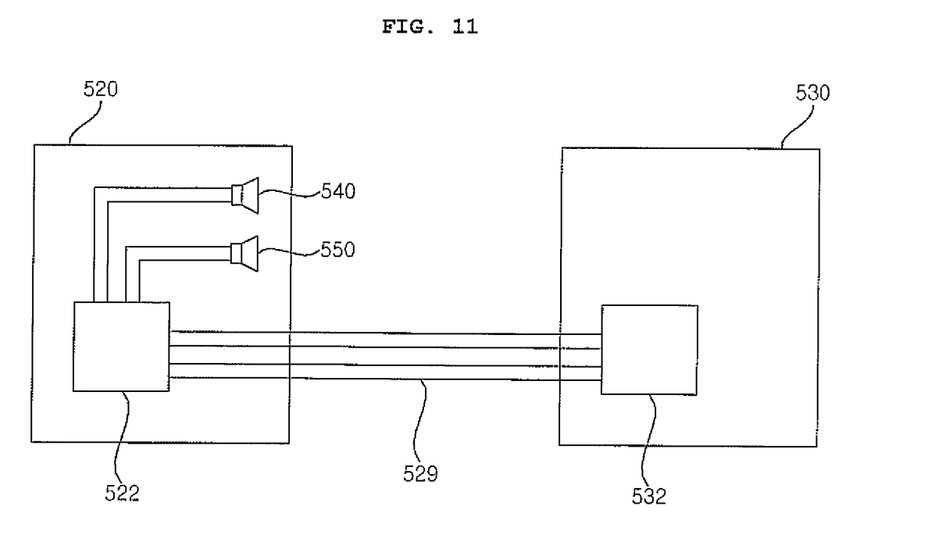
FIG. 11 illustrates control and arrangement configurations of sound output devices in a washing machine according to another embodiment of the present invention.

FIG. 11 illustrates control and arrangement configurations of sound output devices 540 and 550 in a washing machine according to another embodiment of the present invention. As shown in FIG. 11, a first sound output device 540 and a second sound output device 550 are controlled by a main controller 522 and the main controller 522, the first sound output device 540, and the second sound output device 550 are embedded in a first circuit board 520. Other portions of this embodiment are similar to those of FIG. 5 and thus a description thereof is omitted herein.

Figure 12:
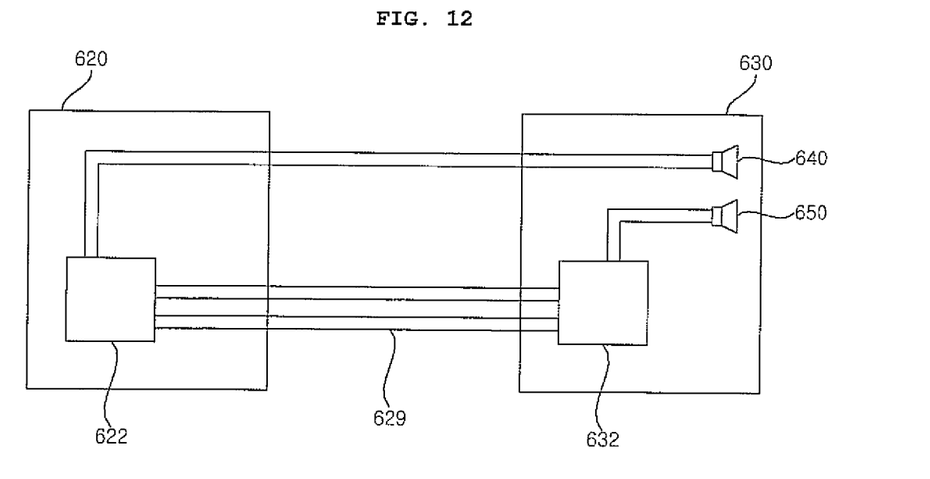
FIG. 12 illustrates control and arrangement configurations of sound output devices in a washing machine according to another embodiment of the present invention.

FIG. 12 illustrates control and arrangement configurations of sound output devices 640 and 650 in a washing machine according to another embodiment of the present invention. As shown in FIG. 12, this embodiment is different from the above embodiments in that a first sound output device 640 is controlled by a main controller 622, a second sound output device 650 is controlled by a control panel controller 632, and the first and second sound output devices 640 and 650 are embedded in a second circuit board 630.

Figure 13:
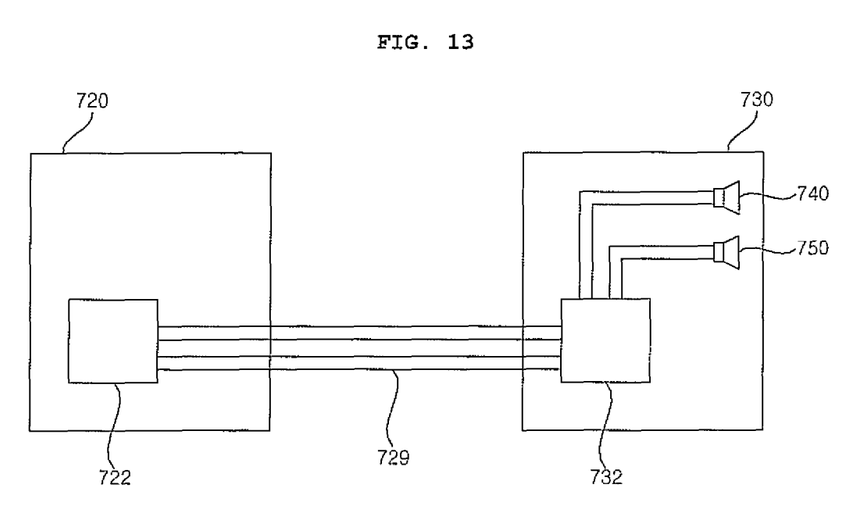
FIG. 13 illustrates control and arrangement configurations of sound output devices in a washing machine according to another embodiment of the present invention.

FIG. 13 illustrates control and arrangement configurations of sound output devices 740 and 750 in a washing machine according to another embodiment of the present invention. As shown in FIG. 13, this embodiment is different from the above embodiments in that first and second sound output devices 740 and 750 are controlled by a control panel controller 732 and are embedded in a second circuit board 730.

As is apparent from the above description, the home appliance of the present invention has a variety of advantages. For example, since a sound signal including status information to be transmitted through a communication network and a sound signal including operating information to be perceived by a user are output through separate sound output devices, it is possible to design the respective sound output devices taking into consideration the characteristics of the sound signals.

In addition, it is possible to minimize change in existing circuitry when a sound output device for outputting a sound signal including status information is additionally provided in the home appliance.

Further, since a separate sound output device for outputting a sound signal including status information is arranged, regardless of the position of a sound output device for outputting a sound signal including operating information, it is possible to increase user convenience and also to perform sound signal transmission through a communication network while minimizing sound signal loss.

It will be apparent to those skilled in the art that various modifications and variations can be made in the present invention. Thus, it is intended that the present invention covers the modifications and variations of the present invention provided they come within the scope of the appended claims and their equivalents.

What is claimed is:

1. A home appliance, comprising:
   a first sound output device;
   a second sound output device;
   a controller configured to generate a data signal including any one of status information or operating information, a first control signal for controlling an output of the first sound output device, and a second control signal for controlling an output of the second sound output device;
   a data signal processor that processes outputs the data signal via a common data transfer line, from which both the first and second sound output device receive the data signal;
   a first sound output device drive that controls the first sound output device to output a first sound representative of the status information, upon receipt of the first control signal, wherein the first sound is input to a portable terminal which is connected to a mobile communication network; and
   a second sound output device drive that controls the second sound output device to output a second sound representative of the operating information to notify a user of the output of the first sound, upon receipt of the second control signal.

2. The home appliance according to claim 1, wherein the data signal processor processes the data signal into a format that can be output by the first sound output device or the second sound output device.

3. The home appliance according to claim 1, wherein the control signal is a pulse width modulated signal.

4. The home appliance according to claim 1, further comprising:
   a cabinet;
   a first circuit board arranged in the cabinet;
   a control panel provided independent of the cabinet; and
   a second circuit board arranged in the control panel, wherein the controller is embedded on the first circuit board, the first sound output device is embedded on the second circuit board, and the second sound output device is embedded on the first circuit board.

5. The home appliance according to claim 4, wherein at least one of the first circuit board or the second circuit board is a printed circuit board.

6. The home appliance according to claim 1, wherein at least one of the first sound output device or the second sound output device is a buzzer.

\* \* \* \* \*